(No Model.)

A. T. NEILSON.
AIR VALVE.

No. 507,380. Patented Oct. 24, 1893.

WITNESSES:
John A. Rennie
C. Sedgwick

INVENTOR
A. T. Neilson
BY
Munn & Co.
ATTORNEYS.

UNITED STATES PATENT OFFICE.

ALFRED T. NEILSON, OF JERSEY CITY, NEW JERSEY.

AIR-VALVE.

SPECIFICATION forming part of Letters Patent No. 507,380, dated October 24, 1893.

Application filed February 24, 1893. Serial No. 463,564. (No model.)

*To all whom it may concern:*

Be it known that I, ALFRED T. NEILSON, of Jersey City, in the county of Hudson and State of New Jersey, have invented a new and Improved Air-Valve, of which the following is a full, clear, and exact description.

My invention relates to improvements in air valves and especially such as are adapted for use on pneumatic tires; and the object of my invention is to produce a cheap and simple valve which may be easily applied to a pneumatic tire, which will enable the air to be pumped easily into the tire, which is provided with a temporary check to prevent any escape of air while the air pump is being disconnected, and which, when finally adjusted, is absolutely air-tight and prevents any air from escaping from the tire.

To this end my invention consists of an air valve, the construction of which will be hereinafter described and claimed.

Reference is to be had to the accompanying drawings forming a part of this specification, in which similar figures of reference indicate corresponding parts in all the views.

Figure 1:
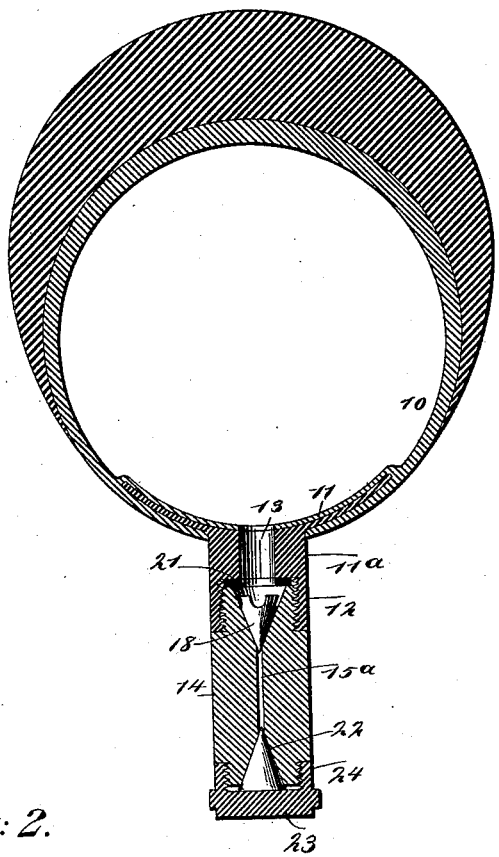
Figure 2:
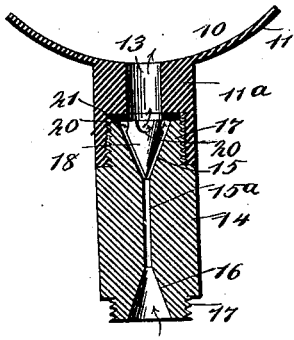
Figure 3:
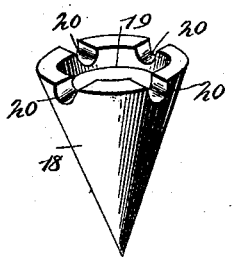

Figure 1 is a cross section of the tire and a longitudinal section of the valve as applied to the tire, both valve and tire being arranged to show the construction of the valve and its connection with the tire. Fig. 2 is a detail sectional view, showing the position of the valve parts when the air is being forced into the tire; and Fig. 3 is a detail perspective view of the check valve which forms a part of the device, and which serves to temporarily prevent the escape of air while the air pump is being disconnected, the check valve serving also as a permanent check to the air as hereinafter described.

The tire 10 is an ordinary pneumatic tire and may be of any make whatever, and it is provided with a felly 11 of the usual kind, having an inwardly extending nipple 11$^a$, the outer end of which is chambered and internally threaded, as shown at 12, and the nipple has also a central bore 13 leading into the tire. The valve casing 14 has conical chambers 15 and 16 at its ends, the smaller ends of the chambers being next the inner portion of the casing, and these two chambers connect by a bore 15$^a$ through which the air passes. The valve casing is reduced and screw threaded at its ends, as shown at 17, one end being adapted to screw into the chamber of the nipple 11$^a$, and the other being adapted to receive a screw cap, as hereinafter described.

In the chamber 17 is a conical valve 18 having a limited longitudinal movement in the chamber, and this valve has a hollow base 19 in the sides of which are ports 20 through which air may pass. The base of the valve 18 is adapted to fit against a gasket or packing ring 21 which is held in the chamber of the nipple 11$^a$ and around the bore 13 of said nipple. The chamber 16 is adapted to receive a conical valve 22 which fits tightly therein, and the base of this valve fits against a screw cap 23 which has a threaded flange 24 adapted to screw upon one of the reduced ends 17 of the valve casing 14.

When the tire is to be filled, the cap 23 and valve 22 are removed. The air pump is then connected with the end of the casing 14, next the chamber 16, and when the air is pumped into the valve casing it passes in through the bore 15$^a$, pushes the valve 18 from its seat, and passes inward around the valve through the ports 20 and bore 13 to the tire, as indicated by the arrows in Fig. 2. When the air pump is disconnected, the back pressure from the tire forces the valve 18 to its seat and the valve fits so snugly that the air does not escape into the bore 15$^a$, and when the valve 22 is applied and the cap 23 screwed to the valve casing, a perfectly air-tight seal is effected, so that if by any possibility a little air should pass the valve it would be stopped by the valve 22. If desired a packing ring may be placed in the cap 23 to abut with the valve 22, although this is not really necessary.

From the foregoing description it will be seen that the valve comprises but few parts, that it may be easily applied to a tire, that no serious obstacle is placed in the way of the ingoing air, that the air cannot escape to any extent while the cap is being placed upon the valve, and that when the cap is in position the valve is perfectly air-tight.

Having thus described my invention, I claim as new and desire to secure by Letters Patent—

1. An air valve, comprising a case having a substantially straight central bore and conical chambers at its opposite ends, solid conical valves capable of free longitudinal movement in the chambers of the casing, the vertexes of the cones being directed toward each other; a cap for one end of the casing, and means for connecting the opposite end of the casing with a receptacle to be filled with air, substantially as described.

2. The combination with a bicycle tire, or similar article, having an inlet nipple, of the valve casing adapted to screw to the nipple, the casing having conical chambers in opposite ends, which chambers connect by a bore, a conical valve held in the inner chamber of the casing and provided with ports in its base, a conical valve held in the outer chamber of the casing, and a screw cap to close the outer end of the casing, substantially as described.

ALFRED T. NEILSON.

Witnesses:
WARREN B. HUTCHINSON,
EDGAR TATE.